United States Patent Office 3,445,165
Patented May 20, 1969

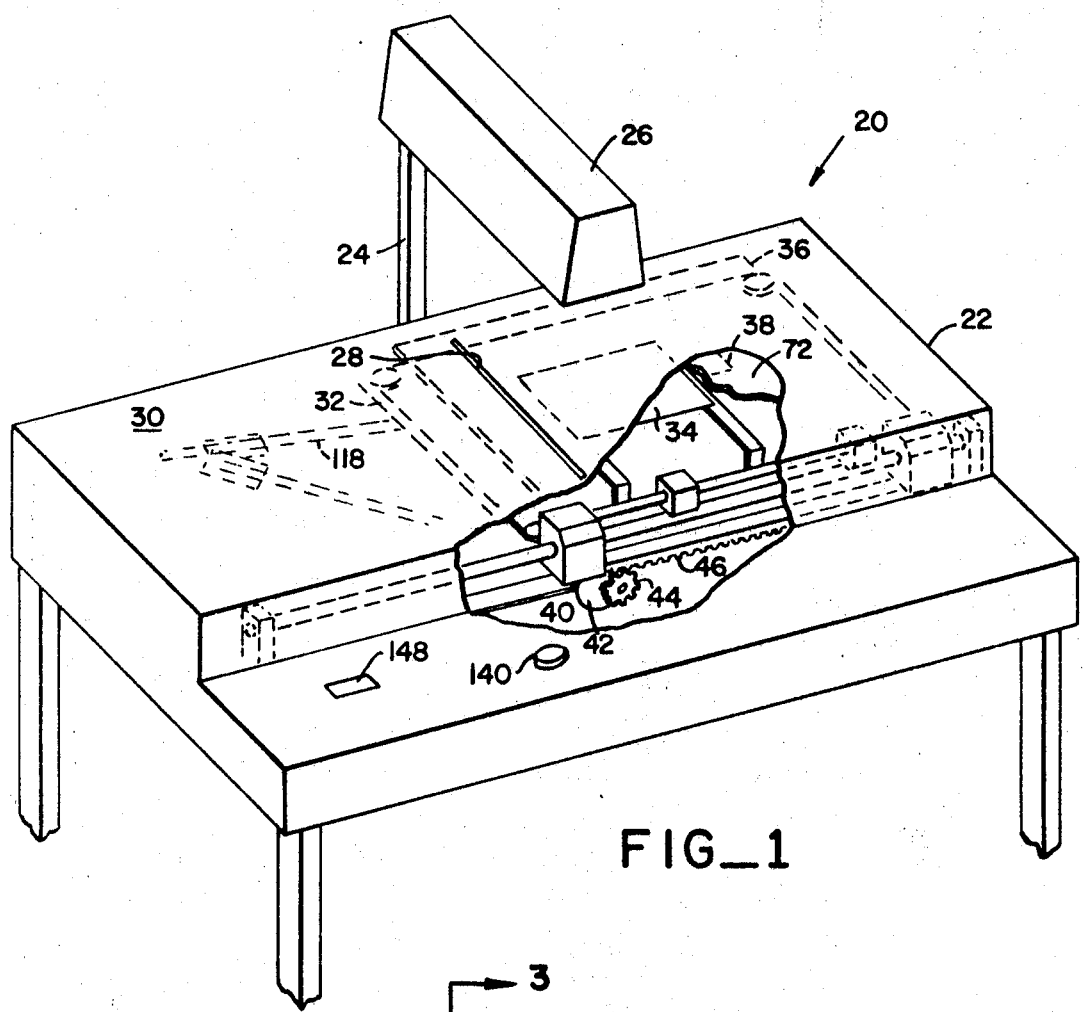
FIG_1
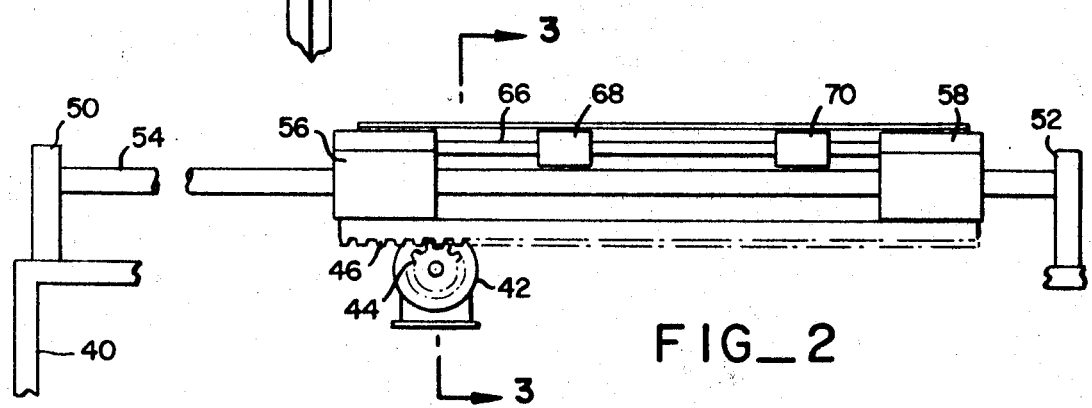
FIG_2
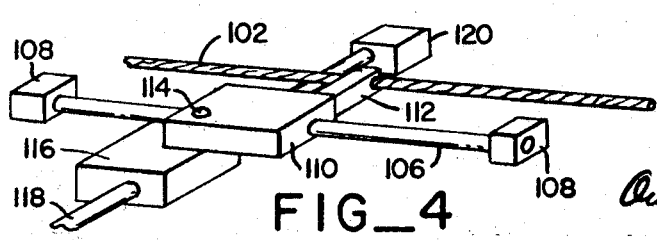
FIG_4
INVENTOR.
WENDELL P. DUBBS
BY
Owen, Wickersham & Erickson
ATTORNEYS May 20, 1969     W. P. DUBBS     3,445,165
PHOTOGRAPHIC DISTORTION DEVICE
Filed Oct. 10, 1966     Sheet 2 of 4
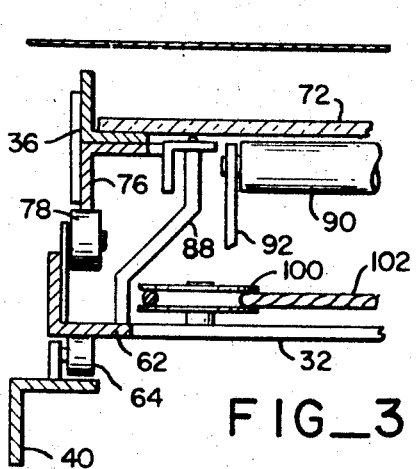
FIG_3
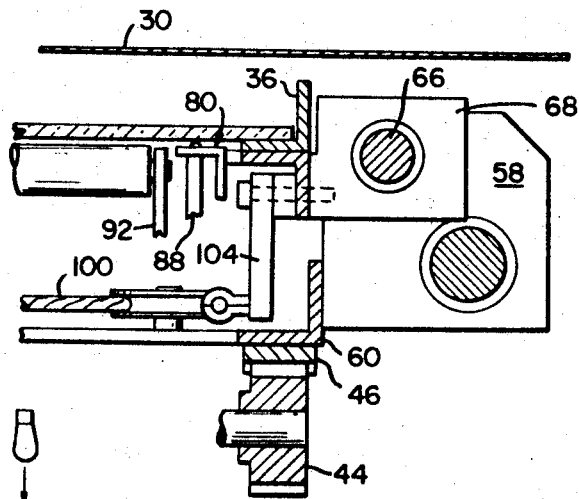
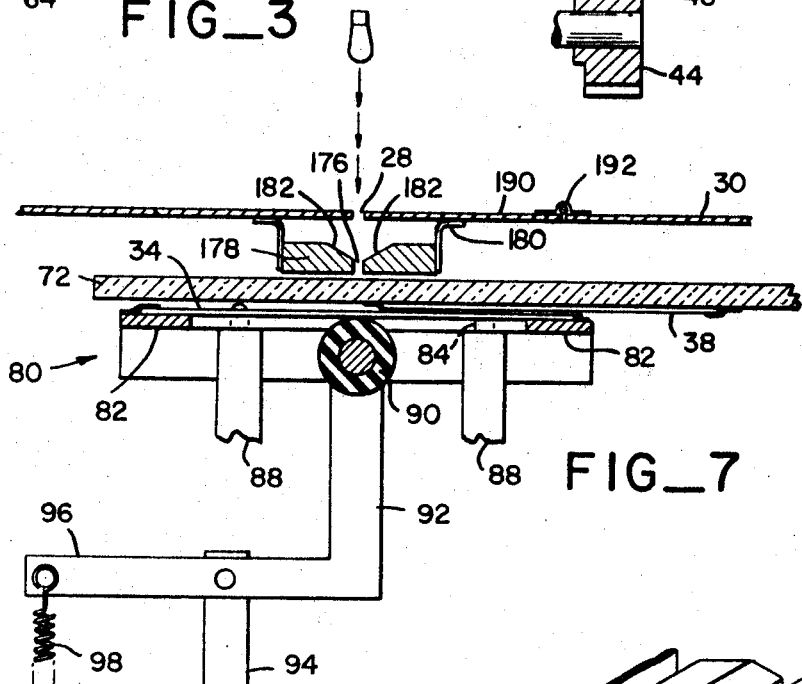
FIG_7
FIG_8
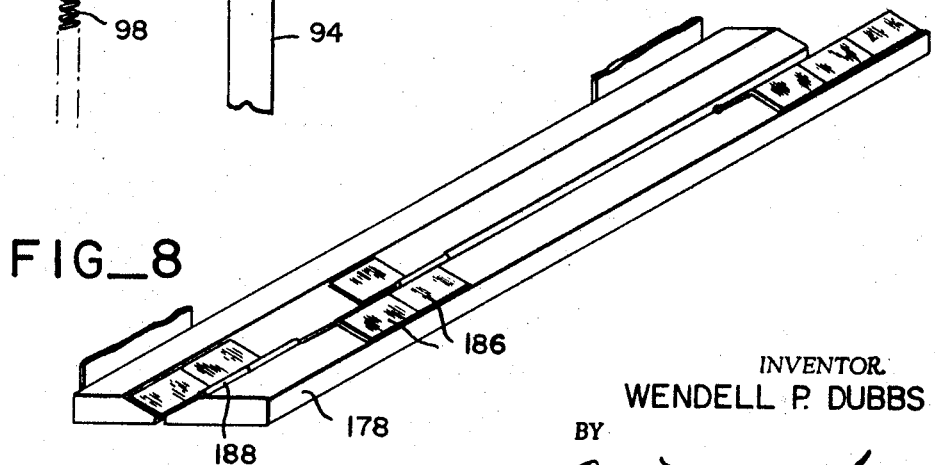
INVENTOR.
WENDELL P. DUBBS
BY
*Owen, Wickersham & Erickson*
ATTORNEYS

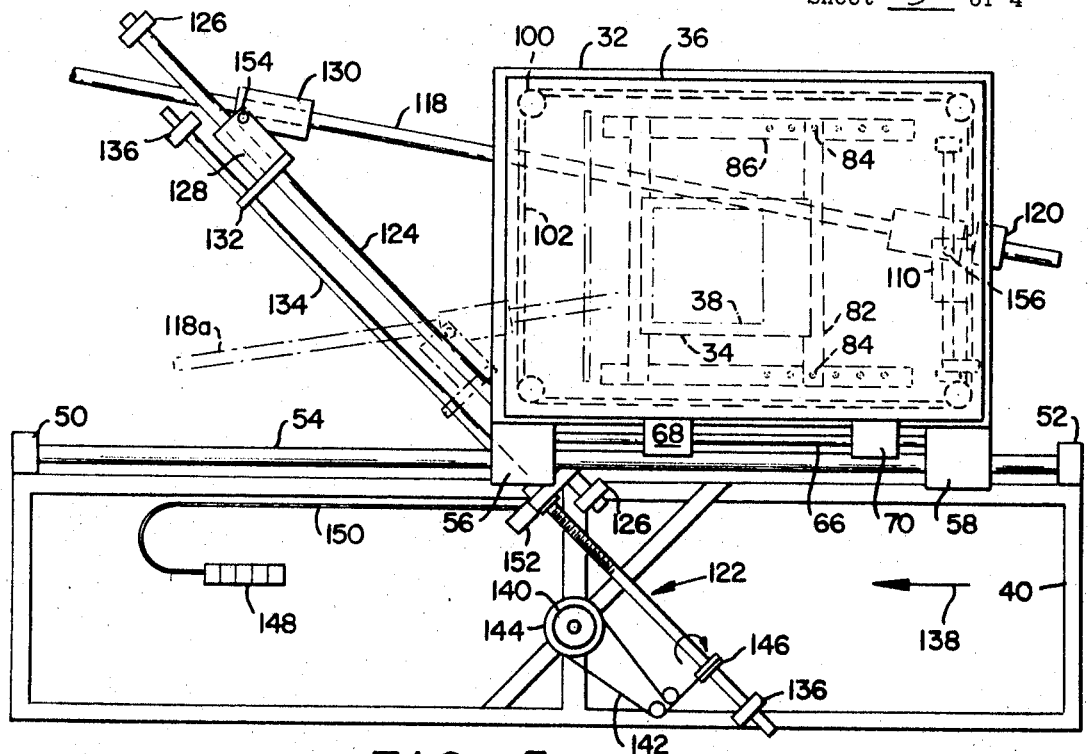

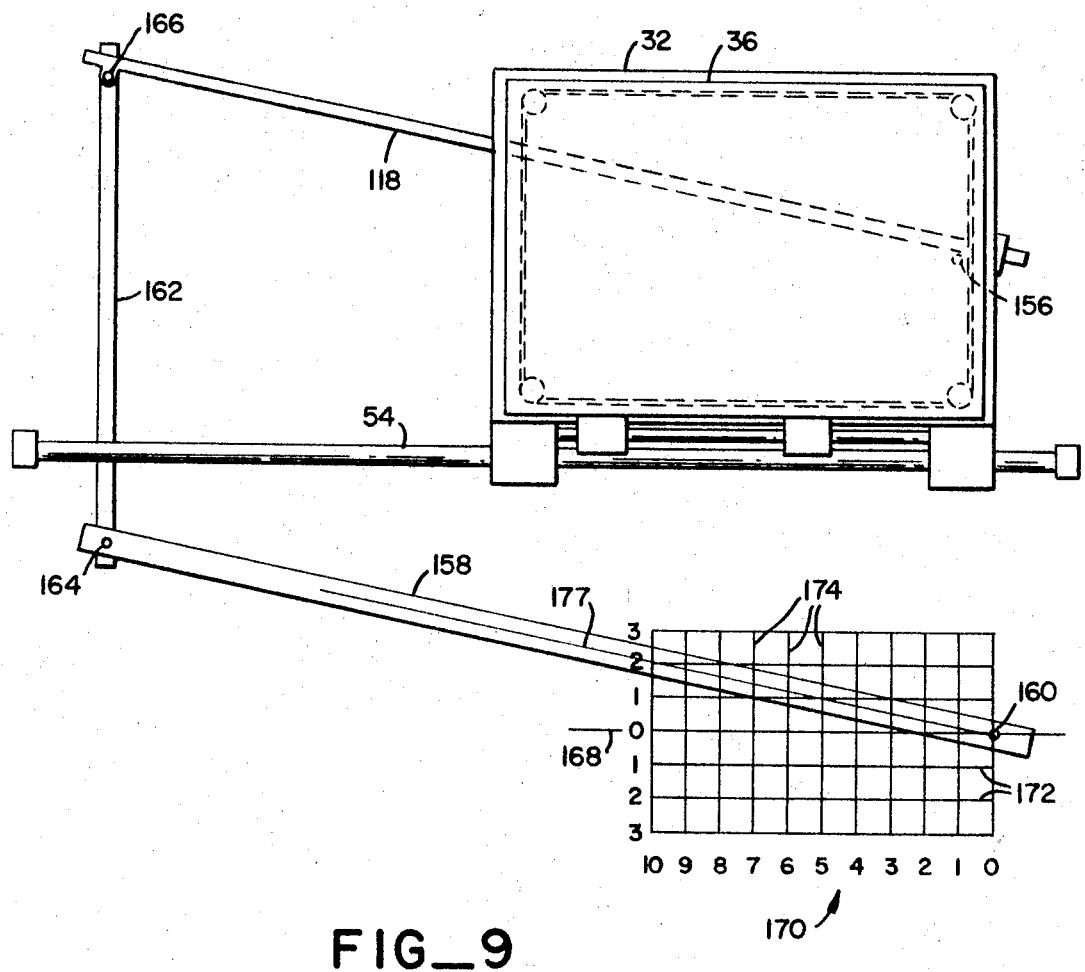
FIG_9

3,445,165
PHOTOGRAPHIC DISTORTION DEVICE
Wendell P. Dubbs, 470 Nevada Ave.,
Palo Alto, Calif. 94301
Filed Oct. 10, 1966, Ser. No. 585,334
Int. Cl. G03b 27/10
U.S. Cl. 355—84    16 Claims

ABSTRACT OF THE DISCLOSURE

A device for producing a print from a photographic image with a predetermined change in one dimension thereof comprising a source of light positioned over a fixed frame with an enclosure around the frame spaced from said light source and having an elongated aperture for admitting light from said source. Within the enclosure is a first mounting means for receiving a photosensitive sheet of material and a drive means for moving said first mounting means at a predetermined rate, and means for supporting said first mounting means for rectilinear movement within said enclosure. A second mounting means for receiving the photographic image to be printed is movable relative to and along the same line of rectilinear travel as said first mounting means, and means are provided that are movable transversely to the line of rectilinear travel in response to movement of said first mounting means and these latter means are connected to said second mounting means for moving it past said light aperture at a predetermined linear rate that is different from the rate of movement of said first mounting means.

---

This invention relates to a photographic reproduction apparatus for producing from a photographic image a print that is distorted by being either enlarged or reduced along one dimension of the image.

In the various graphic art fields it is often a critical problem to provide graphic material such as blocks of printing, designs, photographs, drawings and the like having certain critical dimensions enabling such material to fit certain space requirements. Often only a relatively slight enlargement or reduction of one dimension in a given piece of material is required for a particular application. For example, on printing dies for labels used on various containers, a serious need arose for a fast, efficient apparatus capable of accurately "stretching" or "shrinking" a label design or printing block in one dimension to compensate for normally occurring distortions and thereby enable it to fit a prescribed dimension. Standard photographic enlarging procedures were not adequate to solve the problem because the printed material had to be enlarged or reduced in one dimension only. Previous prior art attempts to provide for unidirectional photostretching resulted in very complicated devices that were often unreliable and inaccurate, as well as difficult to operate and adjust for the amount of distortion required. It is therefore a general object of the present invention to provide a machine that solves the aforesaid problems and accomplishes a predetermined amount of one-dimensional distortion in a two-dimensional graphic article with a high degree of precision and accuracy. Other general objects of my invention are to provide an apparatus of the aforesaid type that is relatively simple in construction, that does not require complicated optical arrangements using lens or prisms and the like, is easy to operate and maintain, and yet an apparatus on which the amount of distortion desired for a particular print can be quickly and easily preset.

A more specific object of the present invention is to provide a unidirectional photographic distortion apparatus wherein a single drive motor moves one frame within an enclosure carrying a film image, and a linkage system connecting the aforesaid frame to another frame carrying a photosensitive sheet material and causing a relative velocity between the two movable frames that both move past an aperture through which light is passed.

Another object of the present invention is to provide a photographic distortion machine wherein a predetermined amount of distortion in one dimension is produced in a photographic reproduction by the relative motion of a film image and a superimposed photosensitive material across a light beam and wherein the film exposure factors may be held constant for varying degrees of distortion produced. This object is accomplished in the present invention by my arrangement wherein a first frame on which the photo-sensitive material is mounted always travels at the same constant velocity across the light beam although a second frame carrying the film image being reproduced may travel at various speeds depending on the amount of distortion being produced.

Still another object of the present invention is to provide a unidirectional photographic distortion apparatus for producing photographic prints wherein the amount of distortion is constant along the full length of the print produced.

Another object of the present invention is to provide a unidirectional photographic distortion apparatus for selectively stretching or reducing lines or strips of a photographic image to produce a distorted print wherein the lines or strips may all have the same or some other predetermined length. Thus, with my machine a block of lettering having originally several lines of varying length can be reproduced with all lines of precisely equal length. This feature is accomplished by means of light gates for selectively blocking the light passing through portions of a light slit during various cycles of the apparatus.

Another object of my invention is to provide a method for producing a photo reproduction from a photographic image having lines or strips of different lengths whereby on the reproduction the lines or strips are selectively distorted to different predetermined lengths or wherein all the lines or strips of the film image are reproduced having the same length.

A further object of my invention is to provide an unidimensional photo-distortion machine in which the amount of distortion desired in the print of a photographic image can be easily preset with a high degree of accuracy before the exposure cycle is initiated.

The aforesaid and other objects are accomplished by an arrangement wherein a first movable frame is provided within the machine on which is mounted a piece of photosensitive material. A second movable frame is provided that is carried by the first frame and on it is mounted the film image which is being printed. A motion transfer system interconnecting the first and second movable frames causes the direct driven longitudinal movement of the first frame to produce a transverse movement which is converted into a supplementary longitudinal velocity component for the second frame that either adds to or subtracts from the driven velocity of the first frame. The second frame thus moves at a different velocity than that of the first frame, the relative difference in velocities thereby producing the photo distortion desired when both frames pass beneath an aperture through which a light beam is shining: the exposure made may be developed by conventional contact printing techniques to provide a distorted print of the original film image upon the photosensitive material carried by the second frame.

Other objects, advantages and features of the present invention will become apparent from the following detailed description presented in conjunction with the accompanying drawings, in which:

FIG. 1 is a fragmentary view in perspective with portions broken away showing a photo distortion machine according to the principles of the present invention;

FIG. 2 is an enlarged fragmentary internal view in side elevation and in section of the machine shown in FIG. 1;

FIG. 3 is a view in elevation and in section taken along line 3—3 of FIG. 2, with a center portion broken away to conserve space;

FIG. 4 is an enlarged fragmentary view in perspective showing the linked slider bushings of the motion transfer system;

FIG. 5 is a partially schematic plan view showing the machine of FIG. 1 set for producing a stretched print before an exposure cycle has commenced;

FIG. 6 is a plan view showing the machine of FIG. 5 after the exposure cycle has been completed;

FIG. 7 is a partially schematic and fragmentary view in side elevation and in section of the machine of FIG. 1;

FIG. 8 is a view in perspective showing the adjustable light gates for the light aperture; and FIG. 9 is a fragmentary plan view of my photo distortion machine showing schematically an alternate means for setting a predetermined amount of distortion.

Referring to the drawing, FIG. 1 shows a unidirectional photographic reproduction device 20 embodying the principles of the present invention which can be operated either to enlarge or to reduce one dimension of a photographic film image. The amount of "stretch" or "shrinkage" desired can be preset by a simple setting and thereafter produced with a high degree of accuracy.

Generally, the device comprises a housing 22 which may be conveniently supported at the proper height by legs in a conventional manner. Attached to the housing by an extendable bracket 24 and positioned above it is a lamp 26 providing a source of light. The housing is essentially a light-tight enclosure except for a transverse aperture or slit 28 which is provided in its top cover 30 and located directly beneath the lamp. The size of the lamp and its distance above the housing can be varied to provide the desired light intensity of the aperture 28.

Within the housing is a first movable mounting frame 32 which is supported to provide rectilinear motion and on which an unexposed sheet 34 of photosensitive material can be mounted. Connected to the first movable frame is a second movable mounting frame 36 on which may be mounted a film image such as a photonegative 38 of the graphic material to be enlarged or reduced. As will be seen from the detailed description that follows, the first frame is driven at a constant velocity past the light slit 28 when an exposure is being made by the device. Simultaneously, the second mounting frame is caused to move at either a faster or slower rate than the first mounting frame, depending on how the device was preset to achieve the desired amount of stretch or shrink. The movement of the photo film image 38 relative to the unexposed photosensitive printing paper 34 as they both move across the light through the split produces the resultant stretch or shrink in the finished photoprint.

I will now describe the device 20 in greater detail and particularly the combination of elements for producing rectilinear motion of the two mounting frames 32 and 36 at relative predetermined velocities.

Forming part of the housing 22, as shown in FIGS. 2 and 3, is a fixed main frame 40 comprised of suitable longitudinal and transverse members having the size and location which is sufficient to give the apparatus strength and rigidity so that it will be stable and operate free from vibration. Supported on this main frame is a constant speed, reversible electric motor 42 whose output shaft is fixed to a driving pinion 44. Spaced longitudinally from the motor on the main frame and fixed to the first movable frame 32 is a rack 46 whose teeth mesh with those of the pinion. Other means for driving the frame 32 may be utilized within the scope of the invention, such as a lead screw or a chain drive.

Extending between a pair of upright fixed members 50 and 52 of the frame 40 located beyond the opposite ends of and aligned with the rack 16 is a main cylindrical support rod 54. Slidably mounted on the main support rod are a pair of spaced apart bearing blocks 56 and 58. The latter are preferably the ball bearing type so that even though fitting closely to the support rod 54, they are movable along it with a minimum of friction. The first movable mounting frame 32 is fixed to the bearing blocks at spaced apart locations on one side member 60. The opposite side member 62 of the movable frame 32 is supported during its entire travel on a ball bearing roller 64 which is fixed to the main stationary frame 40.

Connected between the main bearing blocks 56 and 58 and parallel to the main support rod 54 is a secondary support rod 66. Slidably mounted on this latter rod with a close tolerance are a pair of smaller bearing blocks 68 and 70 which also are preferably of the ball bearing type and thus relatively frictionless. Fixed to these smaller bearing blocks is the second movable frame 36 which supports a sheet of glass or some transparent material 72 having uniform thickness and a planar surface. An opposite side member 76 of the secondary frame 36 is supported on movable ball bearing rollers 78 which are attached to the upper surface of the side member 62 of the lower frame. Thus, the secondary frame 36 is movable along the secondary support rod 66 relative to and parallel with the first movable frame.

Attached to and extending upwardly from the first movable frame 32 is an adjustable mounting rack 80 having cross members 82 to which an unexposed sheet of the photosensitive material 34 can be attached. One cross member of this latter rack may be provided with end pins which fit pairs of holes 84 in its opposite side members 86 and is thereby adjustable so that it can accommodate different sizes of photo material 34 (see FIG. 5). This adjustable frame 80 is secured to the opposite side members 60 and 62 of the first movable frame 32 by suitable upright members 88 which position it directly beneath the glass plate 72 of the second movable frame 36. A cylindrical roller 90 is provided substantially parallel to and beneath the aperture 28 to furnish a constant upward pressure on the photosensitive sheet 34 so that it is held flat against the photo image beneath the light slit 28. Its ends are mounted near the ends of a pair of links 92 which are pivotally connected to upright supports 94 fixed to the main frame 40. The other ends of the links 92 are connected to a counterweight 96 which is also connected by a spring 98 to the main frame. The counterweight aided by the spring causes the roller 90 to exert a firm constant pressure on the underside of the photosensitive sheet 34 during the relative movement between it and the photo image 38.

The means for providing the predetermined relative velocity between the first and second frames 32 and 36 may best be understood with reference to FIGS. 5 and 6. At each corner of the first movable frame 32 is a rotatable pulley 100 mounted on an upright fixed axle. Extending around these pulleys is a continuous motion transfer cable 102 which could also be a linked belt or the like, if preferred. This cable is connected to the second movable frame 36 at a convenient location such as shown by the numeral 104. Parallel to one transverse end member of the first frame 32 is a fixed cam bar 106 which is retained thereon by a pair of end brackets 108. Mounted on this fixed cam bar is a first slider or movable bearing block 110, again preferably of the ball bearing type, the latter being fixed to the cable 102 by a suitable connector 112. The first slider 110 is pivotally connected by a link 114 to a second movable slider 116 of the same type that is mounted on an adjustable cam bar 118. The latter is pivotally connected by a bracket 120 to the stationary main frame 40 of the apparatus 20. This adjustable cam bar 118 is preferably a cylindrical rod of uniform diameter similar to the support rods 54 and 66, and its precise angular position relative to the direction of rectilinear travel of the first and second movable frames 32 and 36 can be adjusted manually, as will be described below. When set at an angular postion relative to the direction of rectilinear travel of the frames 32 and 36, a constant velocity differential between these two frames is established and maintained, and the amount of this velocity differential determines the amount of "stretch" or "shrinkage" in the photoprint produced.

The ease and accuracy with which the adjustable cam bar 118 can be positioned relative to the line of travel of the movable frames 32 and 36 to thereby set a desired amount of "stretch" or "shrink" for a particular photoprint is due to a translator mechanism 122. In the embodiment of FIG. 5, this latter feature comprises a rod 124 fixed by means of a pair of end brackets 126 to the frame 40 and supporting a slider block 128. The latter is pivotally connected by a pin 154 to a similar slider block 130 that is slidably retained on the adjustable cam bar 118. It is seen that movement of the block 128 causes a proportional movement of the block 130 and since the line of travel of the first block 128 is limited, the adjustable cam rod is caused to change its angular position as the second block 130 is moved. The first block 128 has a follower nut 132 fixed thereto to receive and thus be moved by a lead screw 134 which is parallel to the fixed rod 124 and journaled at opposite ends by a pair of bearings 136 fixed to the frame 40. The lead screw and the support rod are oriented on the main frame at an angle of 45° to the direction of travel of both movable frames 32 and 36 which may be called the base line, as designated by the arrow 138. A manual setting dial 140 is journaled in a bearing fixed to the main frame 40 and is connected by a suitable mechanical means to the lead screw 134. As shown, the latter means may comprise a continuous connecting cable 142 that is wrapped around a pulley 144 on the shaft of the setting dial and also a pulley 146 on the lead screw 134. When the setting dial is turned, the lead screw is also turned a precise predetermined amount thereby causing movement of the slider blocks 128 and 130 and hence an angular movement of the adjustable cam bar 118.

The manual setting dial 140 may be provided with graduations to indicate directly the amount of "stretch" or "shrink" to be produced when its rotation is calibrated in terms of the position of the adjustable cam bar. However, to provide greater precision and ease in making this proper cam bar setting before each cycle, I may utilize a digital indicator 148 connected by a driving cable 150 to the lead screw 134 by a gear train 152, the latter including a gear fixed to the lead screw.

When the cam bar 118 is oriented in the direction of travel of the two sliders 128 and 130 is aligned with a line parallel to the direction of travel and through the pivotal axis 156 of the adjustable cam bar 118. The distance between these pivotal axes 154 and 156 (with the cam bar in the aforesaid position) together with the pitch of the lead screw 134, the mechanical reduction of the gear train 152 and the gearing in the indicator 148 determines the amount of distortion that will be shown by the indicator in ten thousandths of an inch per inch of the original image when the setting dial is turned.

Another means for establishing a predetermined amount of distortion in a reproduction of a photo image by positioning the adjustable cam bar 118 in my machine is shown in FIG. 9. In this arrangement I provide a movable setting bar 158 that is pivotally attached at one end, such as by a pin 160, to the housing 22. At its other end the bar 158 is connected by a link 162 which is pivotally attached at one end at 164 to the setting bar, and at the other end to a pivotal connection 166 near the end of the adjustable cam arm 118. The distance between the pivotal connections 156 and 160 of the cam bar 118 and the setting bar 158 and the distance between the pivotal connections 164 and 166 are equal. Also, the distance between the pivotal connections 156 and 166 on the adjustable cam bar 118 is equal to the distance between the pivotal connections 160 and 164 on the setting bar. Thus, the adjustable cam bar 118 and the setting bar form a parallelogram arrangement, the latter constantly maintaining a position relative to a base line 168 that is precisely the same as the position of the adjustable cam bar from a line in the direction of travel of the two frames 32 and 36. In this embodiment, the base line 168 is the central longitudinal line of a graphical chart 170 fixed to the housing beneath the setting arm, the base line passing through the pivotal axis thereof. The chart is provided with divisional lines 172 spaced evenly on opposite sides of the longitudinal base line and evenly spaced lateral lines 174 that are perpendicular thereto. The setting bar 158 is preferably made from a rigid, clear plastic material and has a central longitudinal hair line 177 that passes through its pivotal connecting points. In combination with the chart it provides a quick, accurate and easy way to set the machine for the desired amount of "stretch" or "shrink" of a photo image. For example, if the length dimension of a certain image in the final distorted image is desired to be 5 units and it is necessary to stretch the original photo image by 1 unit to achieve this length, the setting bar is placed so that its hair line 177 passes through the intersection of the lines defining 5 units of final length and 1 unit of "stretch" movement of the setting bar to this position. This also causes a similar movement of the adjustable cam bar, and when the exposure cycle takes place the proper transverse travel is produced by the second frame 36 relative to the first frame 32 to provide the correct distortion.

It should be apparent that the aforesaid setting bar and chart arrangement can be used in addition to or in place of the setting dial arrangement shown in FIGS. 5 and 6.

In order to produce a uniform and sharply defined bar of light that is directed through the aperture 28 a secondary aperture or light slit 176 is formed by a pair of transverse, spaced apart parallel bars 178. The latter are spaced just beneath the aperture 28 on the inside of the enclosure cover 30 and are attached by supporting brackets 180, as shown in FIG. 7. The inner top edges of the spaced apart bars are beveled to form sloped downwardly converging surfaces 182 so that no light is reflected into the interior of the housing 22.

The sloped surfaces 182 form an elongated recess above the light slit 176 which may be used to seat a series of light stopping gates 186 of a modified form of my machine shown in FIG. 8. In instances where it is desired to stretch or shrink longitudinal strips of a photographic image by different amounts this may be accomplished by running it through several exposure cycles with only certain strips of the photo image being exposed during each cycle. The remainder of the photo image can be blanked out during any given exposure cycle by covering the light slit at the proper location. In the present invention this is accomplished by providing the movable gates 186, all of which are connected to a bar 178 by separate hinges 188 aligned along a line parallel with the light slit. The latter may be wedge-shaped in cross section and thereby adapted to fit between the sloped surfaces 182 of the bars 178. The housing cover 30 has a door 190 connected by a hinge 192 parallel to the slit 28 to provide access to the gates 186. When a strip portion of the photo image is to be left unexposed during a cycle, the access door 190 is opened and the appropriate light gate 186 is flipped over and seated between the bars 178. It can be readily seen that any number of gates can be provided, and therefore a given negative can be exposed in any number of strip increments with various amounts of stretch or shrink by utilizing multiple cycles and the appropriate manipulation of the light gates. Other forms of light stopping gates can be furnished within the scope of the invention, and they may be controlled mechanically from outside the housing in various arrangements.

The movable light gates 186 which can be manipulated to control the light passing through the aperture along its length for various cycles or "passes" may be used to particular advantage for providing, from a photo image of a block of printing having a plurality of lines of unequal length, a reproduction thereof wherein all of the lines are "justified" or are of equal length. In this method the first step is to provide a survey of the photo image, which may be done visually or electronically, which indicates the length of each line of the printing block relative to a preselected line of a desired length. Thus, for each line of the block a qualitative determination is made of whether an expansion or a contraction of the line length is required. The lines requiring equal expansion or contraction are noted. The photo image is now mounted in the machine so that each line is aligned with one of the light gates. In the next step a first cycle or pass can be made with the light gates of the photo-distortion machine closed on all of the lines except those of an equal length that are to be "stretched" or "shrunk" a predetermined amount. The amount of stretch or shrink for the particular "pass" is preset by the machine controls, and the exposure cycle is made. Without removing or displacing the photo image or photosensitive sheet additional cycles are then made for other groups of lines of equal length in the printing block, each line of each group being exposed by opening the light gate aligned therewith, the others being closed, and with the machine set to produce the desired amount of "stretch" or "shrink." When all of the lines have been so processed by repeated cycles the reproduction will be completed and when developed it will have lines of equal length. The aforesaid method is of course subject to variations and is obviously adaptable to automated arrangements which may scan the lines of the photo image, set the necessary amount of distortion and thereby increase the recycling speed of the machine.

Summarizing now the operation of my photodistortion machine, the photo image 38 to be stretched or shrunk, such as a photonegative, is first mounted on the undersurface of the glass plate 72 by means such as tape or the like. It is mounted so that the dimension intended to be distorted is parallel to the direction of travel of the first frame 32. The sheet 34 of unexposed photosensitive material is now mounted on the adjustable frame 80 by taping its ends to the cross members 82. The second frame is placed in starting position so that the negative is above the photosensitive material and to one side of the light slit 28. The roller 90 provides a constant pressure to hold the photo image 38 and the unexposed sheet 34 together.

The adjustable cam arm 118 is now moved to the angular position which will produce a desired amount of stretch or shrink in the photoprint to be produced. The cam arm may be positioned to produce a print with the exact desired amount of stretch by setting the dial 140 with reference to the digital indicator 148, as shown in FIGS. 5 and 6, or the movable setting bar 158 may be used as shown in FIG. 9. With the housing lid closed, the light 26 is turned on and the drive motor 42 is energized. The first frame 32 moves at its normal constant velocity with the slider block 116 moving along the angularly positioned cam arm 118. Simultaneously the linked slider block 110 causes the cable or belt 102 to move and hence to move frame 36. A relative velocity thus occurs between the photo image 38 and the unexposed printing sheet 34 as they both move under the light slit 28, the printing material thereby becoming exposed. The amount of exposure to provide the proper photoreproduction is governed by the size of the light slit, the intensity of the light, and the sensitivity of the photosensitive material being used. At the end of an exposure "pass" a switch (not shown) automatically turns the motor off, the light is turned off, and the motor can be reversed to return the frames to their starting position. When the exposed printing material has been replaced, the machine is ready for another cycle.

As stated previously, either stretching or shrinking of a film image can be accomplished. In FIGS. 5 and 6 the adjustable cam arm is set to produce stretching, that is, the first frame with the sheet 34 being printed moves faster than the second frame supporting the photo image. To produce a print that is reduced or shrunk relative to the original photo image the adjustable cam 118 is moved to the opposite side of the line of travel of the movable frames 32 and 36 as indicated by the dotted line 118a. In this latter position the second frame is caused to move faster than the first frame because the second slider 116 moves in the opposite direction thereby producing a print reduced in one dimension.

In essence, what the linkage system accomplishes is an addition or subtraction of the velocity of the second frame from the velocity of the first frame. If the velocities of the two movable frames are added, a shrunk print is produced and if the velocity of the second frame is subtracted from that of the first frame, a stretching of the print occurs.

In the embodiment illustrated the transverse movement of linkage slider 116 is applied to the endless cable or belt 102 which moves the second frame 36 relative to the first frame 32 at a constant rate thereby adding to or subtracting from the velocity of the first frame. The combining of the transverse linkage movement with the rectilinear linkage movement could be accomplished by other equivalent linkage systems within the scope of the invention, although the one shown has several important advantages including the fact that it is particularly accurate and reliable.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A device for producing a print from a photographic image with a predetermined change in one dimension thereof comprising:

a source of light;

a fixed frame;

an enclosure around said fixed frame spaced from said light source and having an elongated aperture for admitting light from said source;

a first mounting means for receiving a photosensitive sheet of material;

means for supporting said first mounting means for rectilinear movement within said enclosure;

a second mounting means for receiving the photographic image to be printed and movable relative to and along the same line of rectilinear travel as said first mounting means;

drive means for moving said first mounting means at a predetermined rate;

and means movable transversely to said line of rectilinear travel in response to movement of said first mounting means, said latter means being connected to said second mounting means for moving it past said light aperture at a predetermined linear rate that is different from the rate of movement of said first mounting means.

2. The device as described in claim 1 wherein said latter means comprises flexible means on said first mounting means having a first portion movable along a line of travel parallel to the direction of rectilinear travel of said first mounting means and a second portion movable transversely to said line of travel, said second mounting means being connected to said first flexible means;

an adjustable cam means connected to said fixed frame retained in an angular position relative to said line of travel;

a fixed cam means on said first mounting means and parallel to said second portion of said flexible means transverse to said line of travel, a first slider member on said fixed cam means and connected to said second portion of said flexible means;

a second slider member on said adjustable cam means and pivotally connected to said first slider member;

whereby rectilinear motion of said first mounting means causes movement of said second slider on said adjustable cam means and transverse movement of said first slider on said fixed cam means, thereby causing said second mounting means to move at a constant rate relative to said first mounting means.

3. The device as described in claim 2 wherein said adjustable cam means comprises an elongated guide bar pivotally connected at one end to said fixed frame, the angular position of said guide bar relative to the line of rectilinear travel of said first mounting means determining the amount of transverse travel of said first slider member and hence of said second mounting means relative to said first mounting means.

4. The device described in claim 3 including setting means for changing the position of said adjustable cam means to change the amount of travel of said second mounting means relative to said first mounting means and indicator means connected to said latter means for providing a visual indication of the amount of unidimensional change to be produced on said photosensitive sheet.

5. The device as described in claim 4 wherein said setting means comprises a turning knob, a lead screw on said fixed frame, means interconnecting said lead screw and said knob, a first link member including a follower nut threadedly engaged to said lead screw, a second link member pivotally connected to said first link member and slidable on said adjustable cam means, said indicator means being responsive to the turning of said knob and said lead screw to provide the digital value of distortion that will be produced by the device according to the set position of the adjustable cam means.

6. The device as disclosed in claim 1 wherein said first mounting means includes a frame with at least one adjustable cross member thereon for receiving the sheet of photosenitive material; and said second mounting means comprises a frame and a transparent plate retained therein located above said photosensitive sheet, said photographic image being mounted on the underside of said plate adjacent said sheet.

7. The device as described in claim 6 including a roller engaging said photosensitive sheet approximately in the area below said light aperture and applying pressure to hold said sheet against said photographic image.

8. The device as described in claim 1 including light controlling means for varying the intensity of light at preselected limited areas along the length of said aperture.

9. The device as described in claim 8 wherein said light controlling means comprises a plurality of light gates each movable from a position blocking a portion of light through said aperture to a non-blocking position.

10. The device as described in claim 8 wherein said light controlling means includes a pair of spaced apart light control bars located beneath said elongated aperture, a plurality of movable light gates for controlling the passing of light between said control bars at preselected positions along their length, said light control bars have opposing beveled edges forming a trough-like recess, said light gates being hinged to one said light control bar along its length, each said gate being V-shaped in cross section on one side so as to fit in said recess.

11. A device for producing a print from a photographic image with a predetermined change in one dimension thereof comprising:
    a source of light;
    a fixed frame;
    an enclosure around said fixed frame spaced from said light source and having an elongated aperture for admitting light from said source;
    a first mounting means for receiving a photosensitive sheet of material movably supported within said enclosure;
    means for supporting said first mounting means for rectilinear movement within said enclosure;
    a second mounting means for receiving the photographic image to be printed and movable relative to and along the same line of rectilinear travel as said first mounting means;
    drive means for moving said first mounting means at a fixed predetermined uniform rate;
    and means movable a predetermined amount transversely to said line of rectilinear travel in response to movement of said first mounting means, means for converting the transverse movement of said latter means to a rectilinear movement of said second mounting means on said first mounting means; whereby said photographic image travels a different distance than said photosensitive sheet as both said mounting means travel beneath said light aperture.

12. The device as described in claim 11 including a means for setting said adjustable cam bar in a position to reproduce a predetermined unidirectional distortion of said photographic image, said latter means comprising: a setting bar pivotally connected near one end to said housing, a link pivotally attached to said setting bar near its opposite end and also to the end of said adjustable cam bar, the length of said link being equal to the distance between the pivotal axes of said setting bar and said adjustable cam bar, said link maintaining said setting bar parallel to said adjustable cam bar at all times.

13. The device as described in claim 12 including a reference means located beneath said setting bar having a base line parallel to the direction of traveling of said mounting frames and indicia providing subdivisions of equal increments thereon, and indicia provding unit reference points along lines transverse to said base line.

14. The device as described in claim 11 wherein said latter means comprises cable means supported on said first mounting means having a first portion movable along a line of travel parallel to the direction of rectilinear travel of said first mounting means and a second portion movable transversely to said line of travel, said second mounting means being connected to said first cable means;

an elongated cam bar pivotally connected to said fixed frame retained in a fixed angular position relative to said line of travel;

a fixed cam means on said first mounting means and parallel to said second portion of said cable means transverse to said line of travel, a first slider member on said fixed cam means and connected to said second portion of said cable means;

a second slider member on said elongated cam bar and pivotally connected to said first slider member;

whereby constant rectilinear motion of said first mounting means causes movement of said second slider on said adjustable cam means and transverse movement of said first slider on said fixed cam means, thereby causing second mounting means to move at a constant rate relative to said first mounting means.

15. From a photo image of a block of printing having a plurality of lines of unequal length, a method of providing a reproduction thereof wherein all of the lines are equal, said method comprising:
    selecting a desired length of line to be printed on the reproduction and determining the plus or minus variations in length of each line on the photo image from the said desired length;
    mounting a sheet of photosensitive material for rectilinear movement at a constant rate;
    mounting said photo image for rectilinear movement adjacent to and along the same direction of travel but at a rate different than said photosensitive material;

selecting lines of equal length on said photographic image requiring an equal amount of distortion and applying light of a predetermined intensity at areas through which said selected lines will pass while adjacent said photosensitive material;

moving said photosensitive material at a constant speed while moving said photo image relative thereto past said light areas, the latter being moved at a rate that "stretches" or "shrinks" the said selected lines so that they are reproduced having the same length as said desired length;

returning said photosensitive material and said photo image to a starting point and repeating the same procedure for other lines of equal length and using a relative rate of rectilinear movement between the photosensitive sheet and the photo image until all of the lines of the block of printing have the same desired length.

16. A device for producing a print from a photographic image with a predetermined change in one dimension thereof comprising:

a source of light;

a fixed frame;

an enclosure around said fixed frame spaced from said light source and having an elongated aperture for admitting light from said source;

a first mounting means for receiving a photosensitive sheet of material;

means for supporting said first mounting means for recilinear movement with said enclosure;

a second mounting means for receiving the photographic image to be printed and movable relative to and along the same line of rectilinear travel as said first mounting means;

drive means for moving said first mounting means at a predetermined rate;

means movable transversely to said line of rectilinear travel in response to movement of said first mounting means, said latter means being connected to said second mounting means for moving it past said light aperture at a predetermined linear rate that is different rate from the rate of movement of said first mounting means;

and means for presetting the difference in rectilinear movement between said first and second mounting means to produce a predetermined amount of unidirectional distortion on the image reproduced on the photosensitive sheet.

References Cited

UNITED STATES PATENTS

| | | | |
|---|---|---|---|
| 1,176,384 | 3/1916 | Lotka | 95—73 |
| 3,126,809 | 3/1964 | Adams et al. | 95—75 |
| 3,158,077 | 11/1964 | Miller et al. | 95—73 |
| 3,309,959 | 3/1967 | Rondthaler et al. | 88—24 |
| 3,374,724 | 3/1968 | Torres | 95—73 X |

NORTON ANSHER, *Primary Examiner.*

CHARLES B. FUNK, *Assistant Examiner.*

U.S. Cl. X.R.

355—97

Disclaimer 3,445,165.—*Wendell P. Dubbs*, Palo Alto, Calif. PHOTOGRAPHIC DISTORTION DEVICE. Patent dated May 20, 1969. Disclaimer filed June 13, 1977, by the assignee, *Snook Corporation*.

Hereby enters this disclaimer to claim 11 of said patent.

[*Official Gazette August 2, 1977.*]